(12) United States Patent
Johnson

(10) Patent No.: US 6,871,725 B2
(45) Date of Patent: Mar. 29, 2005

(54) HONEYCOMB CORE ACOUSTIC UNIT WITH METALLURGICALLY SECURED DEFORMABLE SEPTUM, AND METHOD OF MANUFACTURE

(76) Inventor: Jeffrey Don Johnson, 7810 E. Hartmoor, Witchita, KS (US) 67206

( * ) Notice: Subject to any disclaimer, the term of this patent is extended or adjusted under 35 U.S.C. 154(b) by 0 days.

(21) Appl. No.: 10/372,575

(22) Filed: Feb. 21, 2003

(65) Prior Publication Data

US 2004/0163888 A1 Aug. 26, 2004

(51) Int. Cl.$^7$ ............................................... E04B 1/82
(52) U.S. Cl. .................... 181/292; 181/284; 181/290; 181/293; 428/116; 428/593; 52/793.1
(58) Field of Search .................................. 181/284–296, 181/210; 52/144, 793.1, 239, 806; 428/116, 593, 118; 228/175, 101, 173.6, 181, 193

(56) References Cited

U.S. PATENT DOCUMENTS

| | | | |
|---|---|---|---|
| 3,910,374 A | | 10/1975 | Holehouse |
| 3,948,346 A | | 4/1976 | Schindler |
| 4,077,491 A | * | 3/1978 | Hankel ........................ 181/290 |
| 4,257,998 A | | 3/1981 | Diepenbrock, Jr. et al. |
| 4,265,955 A | | 5/1981 | Harp et al. |
| 4,336,292 A | | 6/1982 | Blair |
| 4,475,624 A | | 10/1984 | Bourland, Jr. et al. |
| 4,594,120 A | | 6/1986 | Bourland, Jr. et al. |
| 4,796,397 A | * | 1/1989 | Capaul ........................ 52/144 |
| 4,807,411 A | * | 2/1989 | Capaul ........................ 52/144 |
| 4,989,688 A | * | 2/1991 | Nelson ........................ 181/287 |
| 5,041,323 A | * | 8/1991 | Rose et al. .................. 428/116 |
| 5,106,668 A | * | 4/1992 | Turner et al. ............... 428/116 |
| 5,376,598 A | * | 12/1994 | Preedy et al. ................. 501/89 |
| 5,437,936 A | | 8/1995 | Johnson |
| 5,460,864 A | * | 10/1995 | Heitkamp .................... 428/116 |
| 5,460,865 A | * | 10/1995 | Tsotsis ........................ 428/116 |
| 5,779,389 A | * | 7/1998 | Niemerski ...................... 404/6 |
| 5,895,699 A | * | 4/1999 | Corbett et al. .............. 428/116 |
| 6,179,943 B1 | * | 1/2001 | Welch et al. ................ 156/160 |
| 6,180,206 B1 | * | 1/2001 | Kain, Jr. ...................... 428/116 |
| 6,203,656 B1 | * | 3/2001 | Syed .......................... 156/292 |
| 6,360,844 B2 | * | 3/2002 | Hogeboom et al. ......... 181/213 |
| 6,536,556 B2 | * | 3/2003 | Porte et al. ................. 181/292 |
| 6,557,799 B1 | * | 5/2003 | Sternberger ............. 244/110 B |
| 6,619,913 B2 | * | 9/2003 | Czachor et al. ............. 415/119 |

OTHER PUBLICATIONS

"Metals Handbook," Desk Edition, American Society For Metals, 8th Printing, May, 1995.
"ASM Handbook," vol. 6, Welding, Brazing, and Soldering, 1993.
"ASM Handbook," Formerly Ninth Edition, Metals Handbook, vol. 7, Power Metallurgy, 1993.

* cited by examiner

*Primary Examiner*—David Martin
*Assistant Examiner*—Renata McCloud
(74) *Attorney, Agent, or Firm*—Jones Day

(57) ABSTRACT

A honeycomb acoustic unit is provided, the unit comprising first and second honeycomb layers, the layers being made of honeycomb core, each being formed by metallurgical bonds, and a deformable septum having two opposing sides, the first and second honeycomb layers being metallurgically bonded to the two opposing sides of the deformable septum.

16 Claims, 3 Drawing Sheets

HONEYCOMB CORE ACOUSTIC UNIT WITH METALLURGICALLY SECURED DEFORMABLE SEPTUM, AND METHOD OF MANUFACTURE

This invention relates to acoustical honeycomb core units having a metallurgically secured, deformable septum, and a method of making such core units. In particular, this invention relates to acoustic honeycomb core units having a metallurgically secured, deformable septum for use in a sound attenuation panel in the high velocity air flow region of an engine nacelle or other applications requiring sound absorption.

BACKGROUND OF THE INVENTION

In the aerospace industry, honeycomb core is commonly employed in the fabrication of various panels and assemblies to provide strength and low weight. A honeycomb core panel comprises honeycomb core bonded between face sheets that close the transverse cells defining the core.

Engine nacelle panels made of honeycomb core can be modified to serve as Helmholtz resonators for attenuating engine noise. One prior art method of making such resonators involves perforating one or both of the face sheets such that the cells of the honeycomb core communicate with the atmosphere via small holes. The cell and hole sizes as well as the thickness of the face sheet are selected such that the panel is tuned to resonate at a pre-selected engine frequency. The cells of the honeycomb core act as multiple resonant chambers wherein the sound waves are broken down into waves of different, and usually higher, frequencies and wherein some of the acoustic energy is transformed into heat, which dissipates into the atmosphere. U.S. Pat. Nos. 3,948,346 and 3,910,374 illustrate examples of such acoustic liners.

Another design for a honeycomb resonator involves a structure comprising a double layer of honeycomb core with a septum bonded between the two layers. Facing material is then bonded with an adhesive on both sides of the double layer to form a panel. This type of construction requires four adhesive bond lines, which degrades the strength of the panel. Also, it can be very difficult to align the individual cells of the adjacent layers. Further, heat transfer is less efficient and varies due to the septum adhesive bond lines and the misalignment of the individual cells.

A typical embodiment of such prior art panels with a honeycomb core septum structure comprises an aluminum or composite outer skin, a first honeycomb core layer adhesively bonded to the skin, a perforated aluminum or composite septum adhesively bonded to the first core layer, a second layer of honeycomb core adhesively bonded to the septum, and a perforated face sheet adhesively bonded to the second layer of core. In such structures, alignment of the cells of the two core layers is very difficult. Also, the presence of the adhesive creates certain difficulties. Such acoustic panels can be used only at relatively low temperatures, the upper temperature limit being determined at least in part by the temperature resistance of the adhesives used in the structure. If the honeycomb core also is constructed using adhesively bonded metal strips, that adhesive also will have an upper temperature limit. Further, the adhesives will become brittle after repeated thermal cycling, and will crack and deteriorate due to the mechanical vibrations experienced by the nacelle panels during normal engine operation.

In the fabrication of a core structure by prior art methods where a septum is provided having various depths within the individual cells, complex machining and assembly techniques are required. This is expensive and time-consuming.

A prior art acoustical core has been reported wherein a single layer of honeycomb core is provided with an intermittent zone in the core which is crushed to form a sound barrier therein. Also, there has been reported a single layer honeycomb core structure wherein the individual cells are filled with foam plugs to a single cell depth. This structure does not provide for varying depth cells. Yet another sound absorption honeycomb core structure provides a cellular array cut obliquely so that the effective lengths of the cells vary along the plane of the cut.

U.S. Pat. No. 4,257,998 and U.S. Pat. No. 4,265,955 disclose a "lost wax" method of making a honeycomb core with a septum. A wax mold is provided with a desired top surface configuration, and a curable material such as a resin is spread over the top surface of the mold. The honeycomb core is then pressed through the resin and wax mold to a desired depth. The entire assembly is heated to cure the resin and set it in place. The assembly is then heated further to allow the wax to melt away. The resulting structure is a core with a resin septum. The resin septum can be perforated or non-perforated. If perforations are desired, the resin septum must be perforated after insertion into the core. Often, each piece of resin septum in each cell must be touched up around its edges to adhere to the cell walls. Also, the resin septum provides no strength to the overall structure and can carry no mechanical load.

U.S. Pat. No. 4,475,624 and U.S. Pat. No. 4,594,120 disclose a method of forming an acoustical core with a resin septum wherein the septum is first sandwiched between two layers of support material having a melting temperature in between the fusing and curing temperatures of the septum material. The honeycomb core is pressed into the supporting materials and septum to position the septum at the desired depth in the honeycomb cells. The resultant assembly is heated sufficiently to allow the septum to fuse and adhere to the honeycomb core. The resultant assembly is then heated sufficiently to melt the support material and allow it to be drained away, leaving the segmented septum in place within the core. Like the lost wax system, this system has the disadvantage that, after the support material has melted away, the pieces of resin septum in each honeycomb cell must be individually touched up at their edges where the cured adhesive or resin has pulled away from the cell walls. Also, this resin septum provides no strength to the overall structure and can carry no mechanical load.

U.S. Pat. No. 4,336,292 discloses a multi-layer honeycomb thermo-barrier material comprising at least four metal honeycomb cellular cores, at least three metal septum sheets disposed between the honeycomb cores, and first and second face sheets disposed on either side of the thermo-barrier material. The thermo-barrier material is made entirely of titanium alloys, TD nickel, niobium, or other super alloys; strips of such materials can be resistance welded together to form a honeycomb core structure. The resistance welded cores are bonded to the septum by brazing or by a technique described in that patent as liquid interface diffusion bonding. The resulting structure is rigid.

It is one object of the invention to provide a honeycomb acoustic barrier unit having a deformable septum metallurgically secured to the honeycomb.

It is another object of the invention to provide a honeycomb acoustic barrier unit that can be constructed using no adhesives.

It is still another object of the invention to provide a honeycomb acoustic barrier unit that is simple to manufacture and assemble.

It is yet another object of the invention to provide a honeycomb acoustic barrier unit having a septum that is capable of carrying a mechanical load.

SUMMARY OF THE INVENTION

In accordance with the invention, a honeycomb acoustic unit comprises a first layer of metal honeycomb core, a metallurgically secured deformable metal septum, and a second layer of metal honeycomb core, the metal septum being metallurgically bonded to each of the first and second honeycomb core layers. Each layer of honeycomb core is formed of strips of metal metallurgically bonded together, preferably by laser welding, then expanded to form a honeycomb core configuration. Because no adhesive is used in the construction of the honeycomb core layers, each layer of honeycomb core can be metallurgically bonded to the septum. The septum adds strength to the acoustic structure and can carry a mechanical load. Further, because the honeycomb core layers can be made of metals and alloys that can be laser welded, the selection of core materials is not limited to those metals that can be only resistance welded, but can encompass other metals such as aluminum and copper. The septum can be perforated or non-perforated as desired in accordance with the acoustic requirements of a particular application.

A method of making an acoustic unit in accordance with the instant invention comprises the steps of providing a first honeycomb core layer and a second honeycomb core layer, the first and second core layers being formed by metallurgical bonds, providing a deformable metal septum layer, metallurgically bonding the first honeycomb layer to one side of the septum layer, and metallurgically bonding the second honeycomb layer to the other side of the septum layer. If the septum is perforated, the perforations can be applied either before the septum is assembled into the acoustic structure, or at any stage during or after the assembly process.

DETAILED DESCRIPTION OF THE INVENTION

Figure 1:
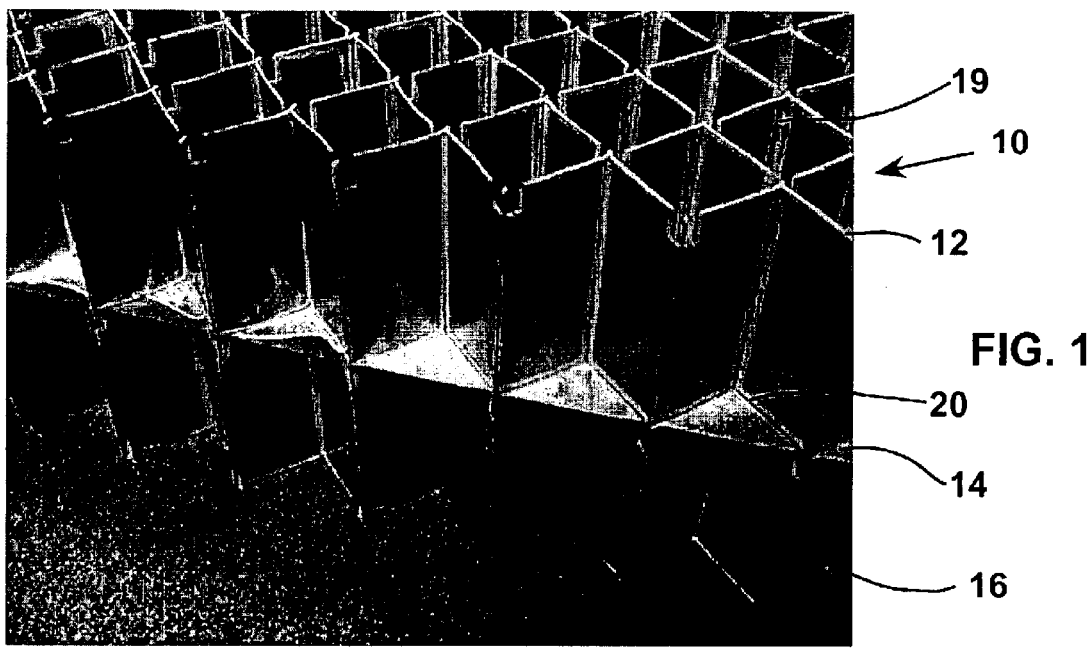
FIG. 1 is a perspective view of a honeycomb acoustic barrier unit made in accordance with the invention.
Figure 2:
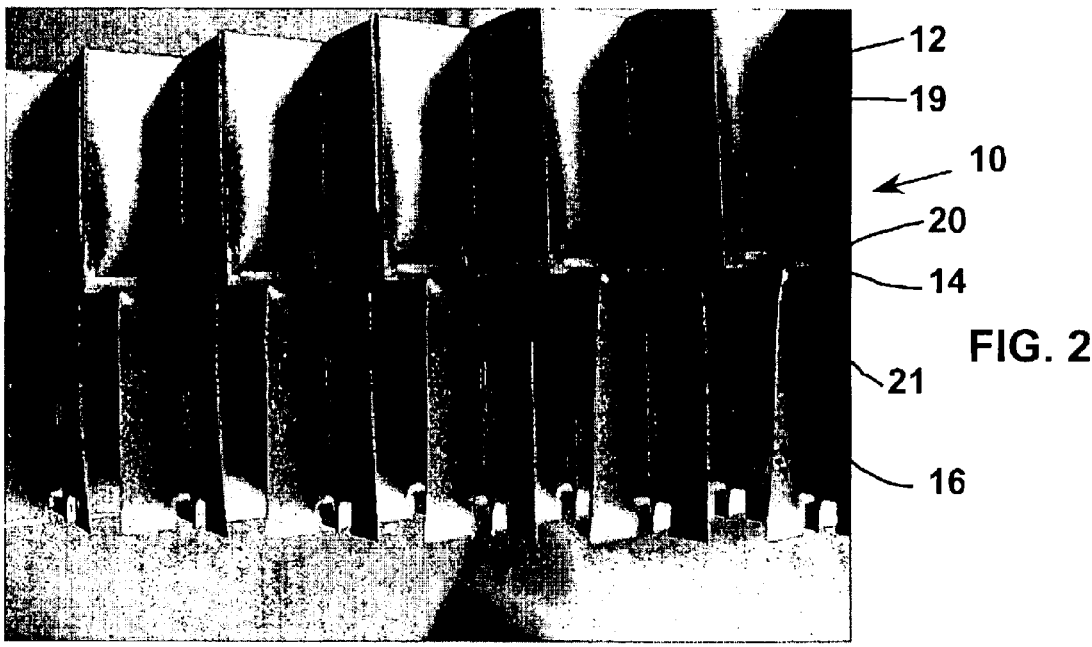
FIG. 2 is a side elevation view of the honeycomb acoustic barrier unit of FIG. 1.

An acoustic barrier unit 10 of the instant invention as illustrated in FIGS. 1 and 2 comprises a first honeycomb core layer 12, a deformable metal septum 14 fabricated from sheet stock, and a second honeycomb core layer 16. The first and second honeycomb core layers 12 and 16 are made without the use of adhesives, and preferably are made by laser welding according to the methods disclosed in U.S. Pat. No. 5,437,936 to Johnson, also the named inventor herein, the disclosure of which is incorporated herein by reference in its entirety. As disclosed in the '936 patent, a honeycomb core is made from a metallic foil sheet assemblage, the assemblage being in the form of a plurality of foil sheets disposed in a stack with their confronting surfaces in contact, with a plurality of weldments 19 between the foil sheets, the weldments being uniformly distributed at spaced intervals, such that when the stack is subjected to tensional forces at the top and bottom, the stack expands to impart a honeycomb configuration thereto. In a particularly preferred embodiment, the weldments 19 of the honeycomb core layers are laser weldments.

In the inventive honeycomb acoustic barrier unit, metal septum 14 is secured to first honeycomb layer 12 by metallurgical bond 20. Metal septum 14 is similarly secured to honeycomb layer 16 by a metallurgical bond 21 visible in FIG. 2. The metal septum 14 thus becomes a load-carrying member of the unit and imparts mechanical strength.

Septum 14 is made of any sheet stock that is deformable and that is metallurgically bonded to the core. Such materials include, by way of example and not by way of limitation, titanium and its alloys; stainless steel alloys; nickel based alloys; non-ferrous alloys, such as those containing aluminum and copper; carbon steels; and alloy steels.

Types of metallurgical bonding suitable for bonding the septum to the layers of core include brazing, liquid interface diffusion bonding (also known as eutectic interface diffusion bonding) as disclosed in the aforementioned U.S. Pat. No. 4,336,292, diffusion bonding, soldering, and various types of welding, including laser welding, resistance welding, and friction welding. Those skilled in the metallurgical arts will recognize other types of metallurgical bonding suitable for use as such bonds in the inventive acoustic barrier unit.

In a preferred embodiment, the septum 14 and layers 12 and 16 of honeycomb core are all made of titanium, and bonds 20 and 21 are made by brazing.

The inventive method of making an acoustic barrier unit as illustrated in FIGS. 1 and 2 comprises the steps of providing a first honeycomb core layer and a second honeycomb core layer, the first and second core layers being formed by metallurgical bonds, providing a deformable metal septum layer, metallurgically bonding the first honeycomb layer to one side of the septum layer, and metallurgically bonding the second honeycomb layer to the other side of the septum layer. If the septum is perforated, the perforations can be applied either before the septum is assembled into the acoustic unit, or at any stage during or after the assembly process.

Those skilled in the art of acoustic nacelle panel design will recognize that cell configurations, cell sizes, cell densities, and septum thickness all can be varied in accordance with the design requirements of a particular application. For example, the cells of the first honeycomb layer and the second honeycomb layer need not be of the same size. The fact that the honeycomb layers are metallurgically bonded to the septum allows the acoustic engineer to choose the cell sizes of each of the honeycomb layers to obtain the desired acoustic effect for any particular application.

Figure 3:
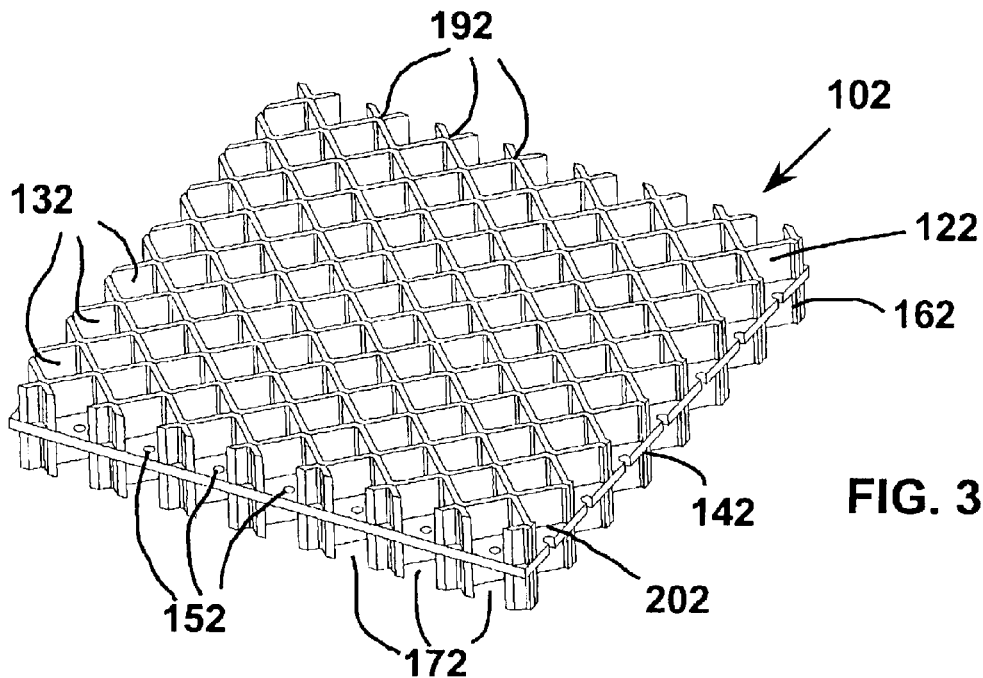
FIG. 3 is a perspective view of yet another honeycomb acoustic barrier made in accordance with the invention wherein the septum has one perforation in each honeycomb cell.
Figure 4:
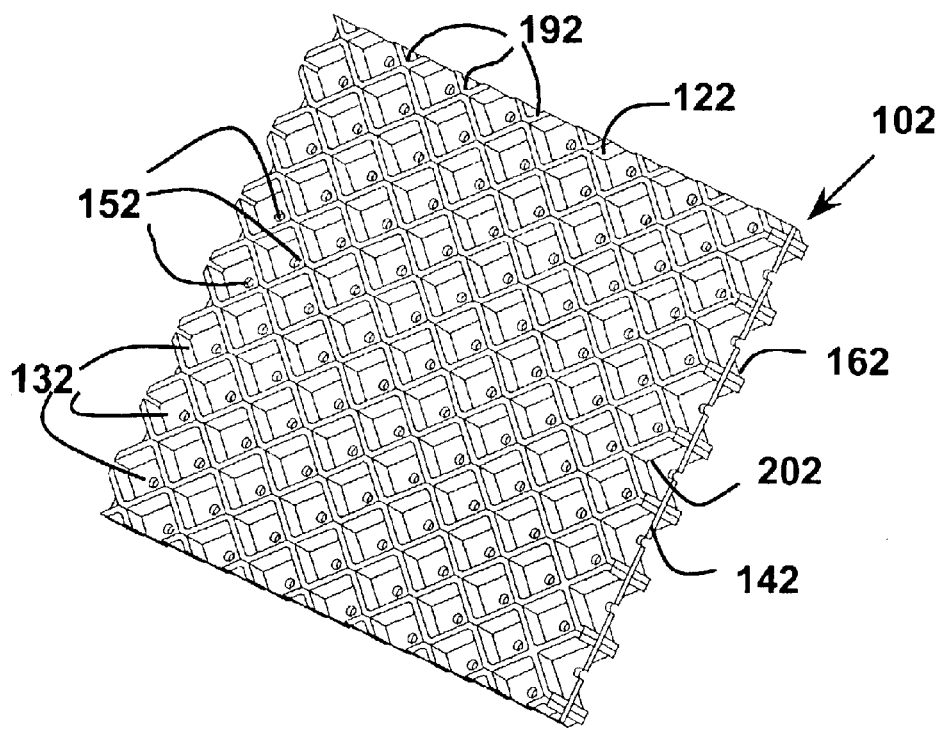
FIG. 4 is a top plan view of the honeycomb acoustic barrier core of FIG. 3.

FIGS. 3 and 4 illustrate a honeycomb acoustic barrier made in accordance with the invention wherein the septum has one perforation in each honeycomb cell. An acoustic barrier unit 102 of the instant invention as illustrated in FIGS. 3 and 4 comprises a first honeycomb core layer 122, a deformable metal septum 142 fabricated from sheet stock, and a second honeycomb core layer 162. In a particularly preferred embodiment, the weldments of the honeycomb core layers are laser weldments, illustrated at 192 in FIGS. 3 and 4.

Metal septum 142 is secured to first honeycomb layer 122 by metallurgical bond 202. Metal septum 142 is similarly secured to second honeycomb layer 162 by a metallurgical bond, not visible in the views of FIGS. 3 and 4. The metal septum 142 thus becomes a load-carrying member of the unit and imparts mechanical strength. It may be seen in FIGS. 3 and 4 that first honeycomb layer 122 comprises a plurality of cells 132, and it may be seen in FIG. 3 that second honeycomb layer 162 comprises a plurality of cells 172. It also may be seen that the portion of the septum 142 in each cell 132 has a perforation 152. These perforations 152 facilitate the transmission of sound waves between the cells 132 and 172. The perforations 152 can be formed by known methods, such as laser drilling. Other methods of providing the perforations will be recognized by those skilled in the art. The perforations can be provided either before or after the honeycomb layers are bonded to the septum. The acoustic engineer can vary the number, size, and distribution of the perforations 152 to achieve desired acoustic effects.

Figure 5:
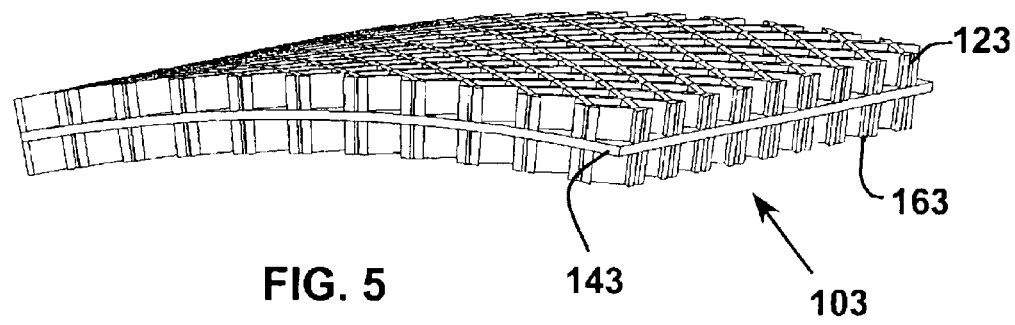
FIG. 5 is a perspective view of a honeycomb acoustic barrier unit made in accordance with the invention wherein the unit has been deformed after manufacture to facilitate installation and use in a nacelle.

It is also possible to form honeycomb acoustic barrier units of the instant invention into contoured shapes. As disclosed in the aforementioned U.S. Pat. No. 5,437,936 to Johnson, laser welded core can be made to be deformable to adapt to the contours of the environment in which it will be used. When such deformable core is used with deformable septum in accordance with the instant invention, the entire core-septum-core unit can be deformed as needed for a particular end use. For example, FIG. 5 illustrates an embodiment of the invention wherein honeycomb acoustic unit 103 comprises first honeycomb layer 123 and second honeycomb layer 163 each metallurgically bonded to septum 143. The layers 123 and 163 and the septum 143 are each deformable even after being metallurgically bonded together, such that the entire unit 103 is deformable. It may be seen that the deformable unit 103 can be conformed to the curved interior surface of an engine nacelle to facilitate installation and use.

Figure 6:
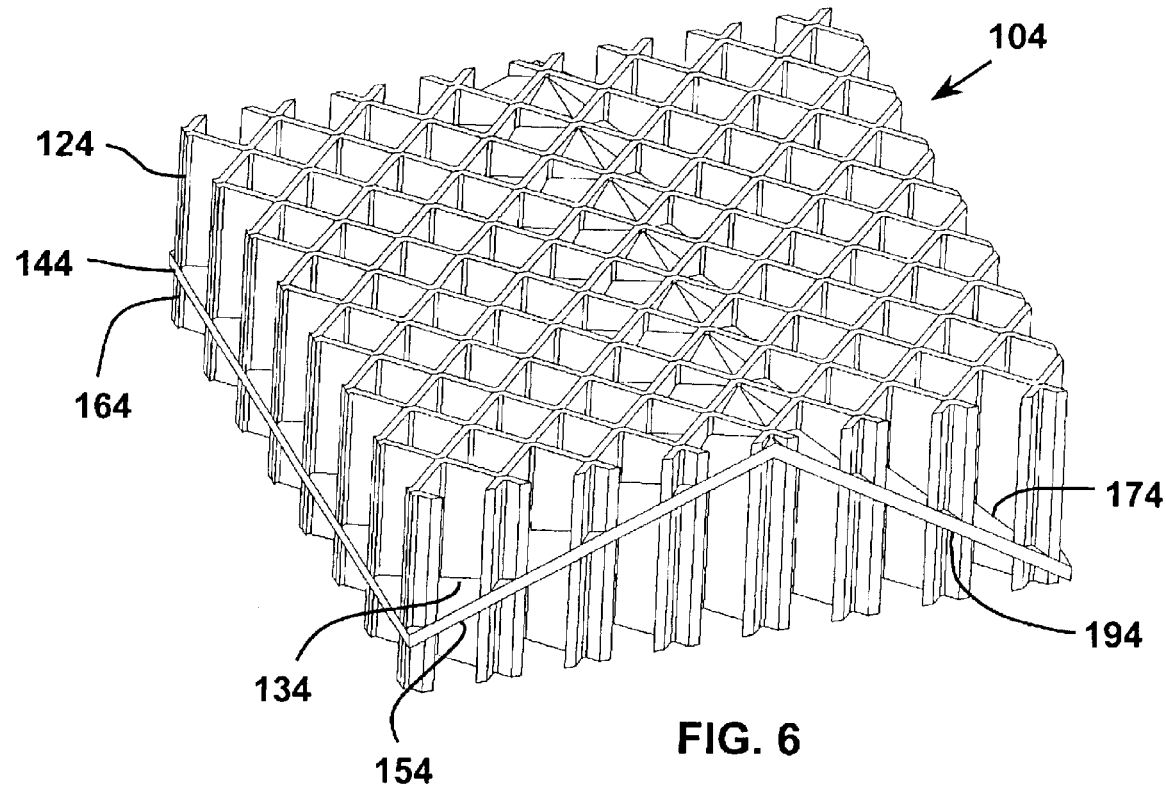
FIG. 6 is a perspective view of a honeycomb acoustic barrier unit made in accordance with the invention wherein the septum is non-planar.

In yet another embodiment, the core layers can be beveled in complementary fashion and bonded to opposite sides of a septum, which can be non-planar. An example of such an embodiment is illustrated in FIG. 6, in which honeycomb acoustic unit 104 comprises first honeycomb layer 124 and second honeycomb layer 164 each metallurgically bonded to septum 144. Each of the layers 124 and 164 is manufactured using metallurgical bonds, preferably laser welding, as discussed above. It may be seen that first honeycomb layer 124 and second honeycomb layer 164 have been provided with complementary beveled surfaces 134, 154, and 174, 194, such that the two honeycomb layers can be bonded to non-planar septum 144. This feature allows the acoustic engineer to vary the cell depth within a single honeycomb acoustic unit, to achieve desired acoustic effects.

The instant invention has significant advantages over the prior art. The metallurgically bonded septum adds greatly to the strength of the acoustic unit. Thus the units are stronger and yet lighter in weight than prior art structures. This additional strength in the acoustic barrier unit allows the use of thinner and lighter weight face sheets in the construction of panels made from the units. Additionally, because there are no adhesives in the honeycomb cores or in the bonds between the core layers and the septum, the inventive acoustic barrier unit is not as prone to degradation from repeated thermal cycling or from mechanical vibrations. When the core and septum are made of the same metals, galvanic corrosion that can occur when dissimilar metals are joined is eliminated.

Although I have disclosed hereinabove various embodiments of acoustic honeycomb core units and acoustic panels comprising such units, and methods of making the same, it will be apparent to those skilled in the art that variants on all the above can be made without departing materially from the scope of the invention disclosed herein.

I claim:

1. A honeycomb acoustic core unit, said unit comprising a first layer of metal honeycomb core,
a deformable metal septum comprising first and second sheet stock surfaces, and
a second layer of metal honeycomb core, said first and second layers of honeycomb core each being formed from a metallic foil sheet assemblage with a plurality of weldments distributed between the foil sheets, said deformable metal septum being metallurgically bonded at each of its first and second sheet stock surfaces to each of said first and second honeycomb core layers, respectively, said acoustic core unit being useful for sound attenuation.

2. The acoustic core unit of claim 1 wherein said plurality of weldments distributed between said foil sheets of said assemblages are laser weldments.

3. The acoustic core unit of claim 1 wherein said first and second honeycomb core layers are each made from at least one material selected from the group consisting of titanium and its alloys; stainless steel alloys; nickel based alloys; non-ferrous alloys; carbon steels; and alloy steels.

4. The acoustic core unit of claim 1 wherein said metallurgical bonds between said septum and each of said first and second honeycomb cores are selected from the group consisting of brazing, liquid interface diffusion bonding, diffusion bonding, soldering, laser welding, resistance welding, and friction welding.

5. The acoustic core unit of claim 1 wherein said first and second honeycomb cores are each formed of titanium foil sheet assemblages with laser weldments, said septum is titanium, and said septum is bonded to each of said first and second honeycomb core layers by brazing.

6. The acoustic core unit of claim 1 wherein said unit is deformable.

7. The acoustic core unit of claim 1 wherein said deformable metal septum is perforated.

8. A method of making a honeycomb acoustic unit comprising
providing a first honeycomb layer and a second honeycomb layer, each of said first and second honeycomb layers being formed from a metallic foil sheet assemblage with a plurality of weldments distributed between the foil sheets,
providing a deformable metal septum having two opposed sheet stock surfaces;
metallurgically bonding said first honeycomb layer to one sheet stock surface of said septum; and
metallurgically bonding said second honeycomb layer to the opposite sheet stock surface of said septum,
said resulting unit being useful for sound attenuation.

9. The method of claim 8 wherein said plurality of weldments distributed between said foil sheets of said assemblages are laser weldments.

10. The method of claim 8 wherein said first and second honeycomb core layers are each made from at least one material selected from the group consisting of titanium and its alloys; stainless steel alloys; nickel based alloys; nonferrous alloys; carbon steels; and alloy steels.

11. The method of claim 8 wherein said metallurgical bonds between said septum and each of said first and second honeycomb cores are selected from the group consisting of brazing, liquid interface diffusion bonding, diffusion bonding, soldering, laser welding, resistance welding, and friction welding.

12. The method of claim 8 wherein said first and second honeycomb cores are each formed of titanium foil sheet assemblages with laser weldments, said septum is titanium, and said septum is bonded to each of said first and second honeycomb core layers by brazing.

13. The method of claim 8 wherein said unit is deformable.

14. The method of claim 8 wherein said deformable metal septum is perforated.

15. The method of claim 14 wherein said perforations are present in said septum prior to being bonded to said core layers.

16. The method of claim 14 wherein said perforations are provided in said septum after said septum is bonded to at least one of said honeycomb layers.

* * * * *